United States Patent [19]

Kadono et al.

[11] Patent Number: 4,920,010
[45] Date of Patent: Apr. 24, 1990

[54] FERROMAGNETIC METAL POWDER

[75] Inventors: Yasuo Kadono; Masaaki Koga; Yoshio Aoki, all of Wakayama, Japan

[73] Assignee: Kao Corporation, Tokyo, Japan

[21] Appl. No.: 239,752

[22] Filed: Sep. 2, 1988

[30] Foreign Application Priority Data

Sep. 2, 1987 [JP] Japan .................................. 62-219784
Mar. 1, 1988 [JP] Japan .................................. 63-48488

[51] Int. Cl.$^5$ ............................................. H01F 1/11
[52] U.S. Cl. ...................................... 428/570; 148/105
[58] Field of Search ......................... 75/251; 428/570; 148/105

[56] References Cited

U.S. PATENT DOCUMENTS

| | | | |
|---|---|---|---|
| 3,718,594 | 2/1973 | Miller | 428/570 |
| 4,501,610 | 2/1985 | Yazu et al. | 148/105 |
| 4,576,635 | 3/1986 | Araki et al. | 148/105 |
| 4,608,093 | 8/1986 | Umemura et al. | 148/105 |

Primary Examiner—John J. Zimmerman
Attorney, Agent, or Firm—Birch, Stewart, Kolasch & Birch

[57] ABSTRACT

A ferromagnetic metal powder comprises a ferromagnetic metal particle composed mainly of iron, a silicon compound layer formed on the surface of the ferromagnetic metal particle in such an amount that the amount of silicon is 0.1 to 1% by weight based on iron in the ferromagnetic metal particle, and a layer containing a nonferrous transition metal element compound in an amount of from 2 to 15% by weight based on the weight of iron in said ferromagnetic particle which is formed on the silicon compound layer.

4 Claims, 1 Drawing Sheet

FERROMAGNETIC METAL POWDER

FIELD OF INDUSTRIAL APPLICATION

The present invention relates to a ferromagnetic metal powder used for a magnetic recording medium and also to a process for the preparation thereof. More particularly, the present invention relates to a ferromagnetic metal powder having excellent oxidation resistance and a process for the preparation thereof.

STATEMENT OF PRIOR ARTS

Recent development of various signal recording systems is remarkable, and progress in the reduction of the size and weight of magnetic recording/reproducing apparatuses is especially prominent. Accordingly, an improvement in output characteristics and recording density is eagerly desired in magnetic recording media such as magnetic tapes and magnetic disks.

A magnetic powder having a high coercive force and a high saturation magnetization is necessary as the magnetic material for a magnetic recording medium satisfying this requirement.

As the magnetic powder for magnetic recording, there have been used acicular magnetite and maghemite, and so-called cobalt-containing iron oxides formed by modifying these magnetic iron oxide powders with cobalt. However, a ferromagnetic metal powder having a higher coercive force and a higher saturation magnetization, that is a so-called metal powder, is recently used for obtaining recording medium having a much higher output.

Since this metal powder is chemically unstable, it is easily oxidized and the saturation magnetization and coercive force are reduced with the lapse of time. As means for overcoming this defect, there is known a method in which a ferromagnetic metal powder composed mainly of iron is alloyed with a transition metal such as cobalt or nickel to improve the oxidation resistance. This method, however, is defective in that if the content of the transition metal is increased, the inherent magnetic characteristics are lost and the high coercive force and high saturation magnetization cannot be maintained.

There has also been proposed a method in which a layer containing a transition metal is formed on the surface of a particle of an oxide composed mainly of iron oxide, which is a precursor of a ferromagnetic powder, and the coated particle is then reduced to effect alloying only on the surface portion of the particle. However, this method is yet insufficient in that any product having sufficient magnetic characteristics and oxidation resistance cannot be obtained.

It is therefore an object of the present invention to provide a ferromagnetic powder having excellent oxidation resistance and high coercive force and saturation magnetization, and a process for the preparation thereof.

SUMMARY OF THE INVENTION

Figure 1:
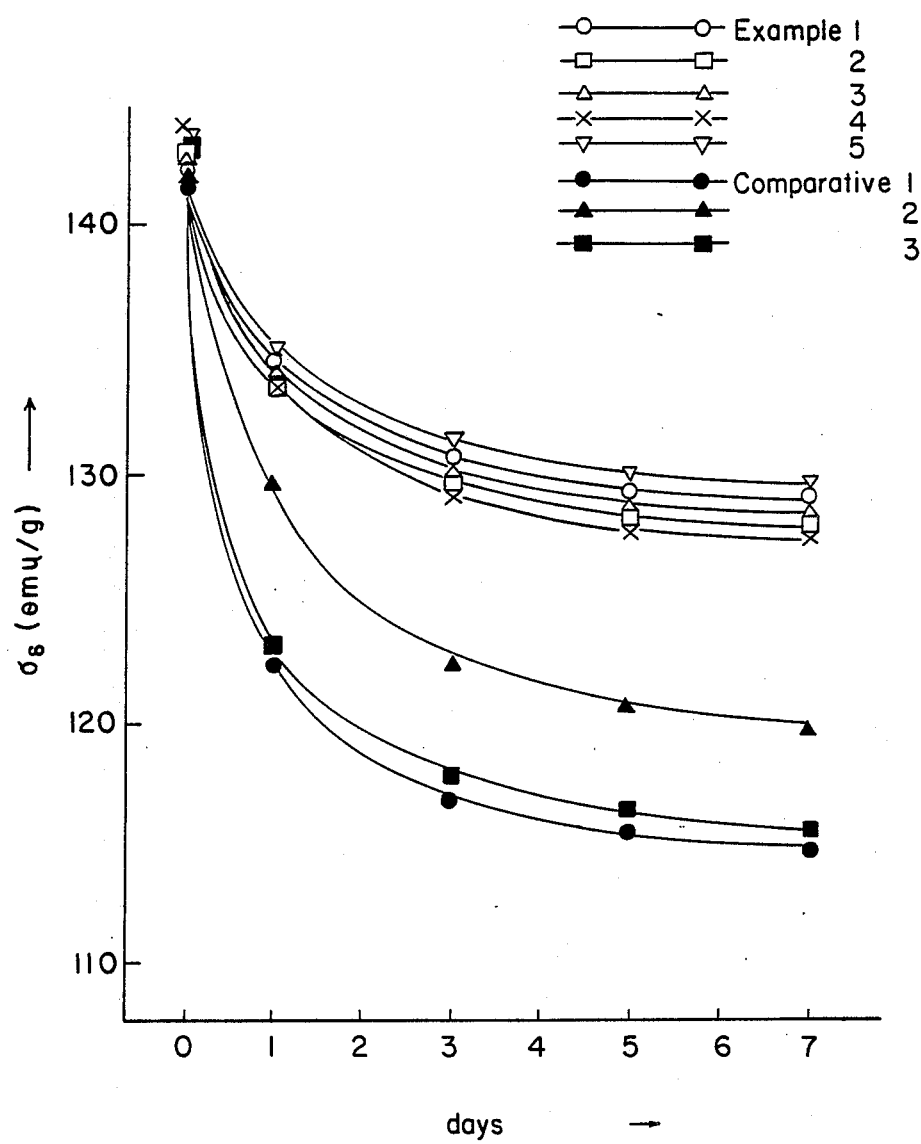
FIG. 1 is a graph showing the results of the heat stability test of the ferromagnetic metal powders prepared in the Examples and Comparative Examples.

We previously found that oxidation resistance could be highly improved by forming a layer of an alloy of iron and a transition metal on the surface of a ferromagnetic metal particle.

Furthermore, it was found that a ferromagnetic powder composed mainly of iron, which was obtained by forming a layer of an oxide powder containing a transition metal under specific conditions on the surface of a particle of an oxide composed mainly of iron oxide, which was a precursor of a ferromagnetic metal powder, and reducing the coated particle, provided excellent oxidation resistance (Japanese Patent Application No. 206534/1986).

We have furthered our research and as the result have succeeded in developing an excellent ferromagnetic metal powder having enhanced magnetic characteristics by forming a silicon compound layer between a transition metal compound layer and a particle of an oxide composed mainly of iron oxide instead of forming the transition metal compound layer directly on the surface of the oxide particle.

More specifically, in accordance with the present invention, there is provided a ferromagnetic metal powder comprising a ferromagnetic metal particle composed mainly of iron, a silicon compound layer formed on the surface of the ferromagnetic metal particle in such an amount that the amount of silicon is 0.1 to 1% by weight based on iron in the ferromagnetic metal particle, and a layer containing a nonferrous transition metal element compound, which is formed on the silicon compound layer.

Furthermore, in accordance with the present invention, there is provided a process for the preparation of a ferromagnetic metal powder as set forth above, which comprises forming a coating of a silicon compound on the surface of an oxide particle composed mainly of iron oxide, forming a coating containing a nonferrous transition metal element on the silicon compound coating by using either (a) a salt of a nonferrous transition metal element or (b) a ferrous salt and a salt of a nonferrous transition metal element and an alkali, and carrying out reduction without disturbing the order of lamination.

As the ferromagnetic metal composed mainly of iron, that is used in the present invention, there can be mentioned, for example, $\gamma\text{-Fe}_2O_3$, $\alpha\text{-Fe}_2O_3$ and $Fe_3O_4$. So-called hydrous iron oxides such as $\alpha\text{-FeOOH}$ and $\gamma\text{-FeOOH}$ are not preferred because the dehydration step is necessary and it is difficult to form a silicon compound layer as intended in the present invention.

Although the content of silicon in the silicon compound layer formed on the surface of the ferromagnetic metal particle depends on the specific surface area of the iron oxide or the like, it is indispensable in the present invention that the content of silicon should be 0.1 to 1% by weight based on iron in the ferromagnetic metal particle. If the content of silicon is outside this range, the oxidation resistance of the ferromagnetic metal powder is reduced and good results cannot be obtained.

As the nonferrous transition metal element constituting the topmost layer of the ferromagnetic metal particle of the present invention, there can be mentioned, for example, Co, Ni, Cr, Cu, Mn and Zn, and it is preferred that the content of the nonferrous transition metal element be 2 to 15% by weight, especially 4 to 10% by weight, based on iron in the ferromagnetic metal particle. If the content of the nonferrous transition metal element exceeds 15% by weight, the magnetic characteristics are degraded, while if it is lower than 2% by weight, no sufficient oxidation resistance can be obtained.

In the production of magnetic iron oxide, a silicon compound is sometimes used for maintaining the acicular shape of goethite as the starting material and preventing sintering among particles themselves. However, in the case of the formed silicon compound layer, even if coating with a nonferrous transition metal element, when dehydration and reduction are carried out as in the present invention, any intended effects of the present invention cannot be attained. This is presumably so because the silicon compound adhering to the surface of the goethite is released from the surface or diffused into the interior during the subsequent steps, especially the dehydration step, so that an amount of the silicon compound on the surface layer is reduced.

The process for the preparation of the ferromagnetic metal powder of the present invention will now be described.

According to the preparation process of the present invention, at first, a silicon compound layer should be formed on the surface of a particle composed mainly of iron oxide. For example, a powder of the above mentioned oxide is dispersed in a solution of sodium silicate and the pH value of the slurry is adjusted to a level close to the neutral value with acetic acid, nitric acid, or the like. More specifically, 200 g of iron oxide is added to 2 l of a 3% solution of Poise 530, a dispersant available from Kao Corporation, and the mixture is dispersed and stirred for about 1 hour with a homomixer (TK Homomixer SL supplied by Tokushu Kika Kogyo Co., Ltd.). Then 7 g of sodium silicate having 29% of $SiO_2$, called diatomaceous earth No. 3, is further added and the mixture is stirred for more than 1 hour. At this step, the temperature of the mixture need not particularly be adjusted. Then, dilute nitric acid is added to adjust the pH value to about 7, and the mixture is stirred for about 1 hour.

According to another process, an alkoxysilane is added to a slurry of the oxide and hydrolysis is carried out. The process for formation of the silicon compound layer is not particularly critical, and any process can be adopted.

According to the present invention, after formation of the silicon compound layer, the particle is coated with a salt of a nonferrous transition metal element t form a layer containing a nonferrous transition metal element compound The counter ion of the salt is not particularly critical, so far as the salt is water-soluble. However, in the case where a halide is used, if washing is not sufficient, oxidation of a metal ion is promoted by the residual halogen, and therefore it is necessary to perform washing completely. From this viewpoint, use of a nitrate, a sulfate, an acetate or the like is advantageous.

A preferable process for forming a layer containing a nonferrous transition metal element by using a salt as mentioned above comprises adding either an aqueous solution of a salt of a nonferrous transition metal element or an aqueous solution of a ferrous salt and a salt of a nonferrous transition metal element to an alkali solution having, suspended therein, iron oxide or the oxide composed mainly of iron oxide, on which the silicon compound coating has been formed, causing a reaction in a non-oxidizing atmosphere at 70° C. or below for at least 1 hour, preferably 2 to 15 hours, and aging the mixture for at least 5 hours, preferably 5 to 20 hours, while maintaining the temperature of the mixture at 80° to 100° C.

Addition of either the aqueous solution of the nonferrous transition metal element salt or the aqueous solution of the nonferrous transition metal element salt and the ferrous salt may be conducted at once or in portions.

In the preparation process of the present invention, a dispersant or other additives may be added to the reaction mixture.

According to the present invention, the obtained laminated oxide powder is reduced into a ferromagnetic metal by using a reducing gas. At this step, the reduction should be conducted so that the order of lamination of the silicon compound coating and the nonferrous transition metal element coating is not disturbed. This reduction is accomplished by feeding the starting powder in a retort oven and maintaining the powder at 360° to 460° C. for 2 to 6 hours while flowing a reducing gas. If abrupt reduction should occur, breaking of the particle would occur, resulting in degradation of the magnetic characteristics. In such a case, it is preferred that the temperature at the initial stage of the reduction be lowered or the reducing gas be diluted with an inert gas. Hydrogen and carbon monoxide are preferable as the reducing gas, and in the case where the inert gas is used according to need, nitrogen and argon are preferable.

If the reduction temperature is too high, the acicular shape of the particle is lost, or fusion of the particle is caused and the magnetic characteristics is often degraded as in the case of abrupt reduction. In order to avoid this disadvantage, the powder may be treated with silica or alumina prior to the reduction.

One embodiment of the step subsequent to the reduction step will now be described.

In 1 liter of a 3% solution of Poise 530, being available from Kao Corporation, is dispersed 200 g of the iron oxide containing the nonferrous transition metal element and silicon, which has been prepared according to the above-mentioned procedures, and the dispersion is stirred for about 1 hour with a homomixer (TK Homomixer SL). Then, 17 g of diatomaceous earth No. 3 is added thereto and the mixture is stirred for 1 hour, followed by neutralization and silica treatment. 10 g of the obtained dry powder is collected and fed in a retort oven, and the temperature is elevated to 400° C. over a period of 2 hours while circulating hydrogen gas at a rate of about 3 l/min and this temperature is maintained for 4 hours. Then, the powder is cooled and toluene containing oxine is fed into the furnace to withdraw the powder. Finally, the powder is dried at room temperature in vacuum to give the ferromagnetic powder of the present invention.

EXAMPLE OF THE INVENTION

EXAMPLE 1

In 2 l of a 3% solution of Poise 530 (supplied by Kao K.K.) was dispersed 200 g of commercially available γ-iron oxide (average major axis diameter of 0.25 micron, aspect ratio of 8 to 10, Si/Fe of 0.05% by weight or below), and the dispersion was stirred for about 1 hour with a homomixer (TK Homomixer SL supplied by Tokushu Kika Kogyo Co., Ltd.). Then 7 g of sodium silicate ($SiO_2$ content of 29%) was added to the mixture and stirring was conducted for 1 hour. Then, the pH value was adjusted to about 7 by addition of dilute nitric acid and the mixture was stirred for 1 hour, followed by filtration, washing and drying, to give an iron oxide (Si/Fe of 0.6% by weight) having a silicon compound layer. By the XPS measurement (determination of the intensity ratio of Fe2p to Si2p), it was confirmed that silicon was concentrated on the surface portion of the particle. 100 g of the formed iron oxide having the silicon compound layer was added to 700 g of a 6% aqueous solution of caustic soda, and a solution of 35 g of cobalt sulfate heptahydrate in 160 ml of water was added to the obtained slurry while blowing nitrogen into the slurry. Reaction was carried out at 40° C. for 6 hours, and the reaction temperature was elevated to reflux the reaction mixture for 6 hours to thereby prepare an iron oxide containing cobalt and silicon (Co/Fe of 9.5% by weight, Si/Fe of 0.6% by weight).

The obtained iron oxide containing cobalt and silicon was dispersed in 1 l of a 3% solution of Poise 530 (supplied by Kao K.K.) and the dispersion was stirred for about 1 hour with a homomixer (TK homomixer SL). Then 17 g of sodium silicate was added to the mixture and stirring was conducted for 1 hour, followed by neutralization and silica treatment. 10 g of the obtained dry powder was collected and fed in a rotary tubular furnace. The temperature was raised to 400° C. over a period of 2 hours while circulating hydrogen gas at a rate of 3 l/min and maintained for 4 hours. After cooling, toluene containing 0.1 g of oxine was fed into the furnace and the powder immersed in toluene was withdrawn therefrom and dried at a normal temperature under reduced pressure to give a ferromagnetic metal powder containing cobalt and silicon.

With respect to the obtained dry metal powder, the ignition point was measured and the oxidation resistance test at a high temperature was carried out. Results are shown in Table 1 and FIG. 1.

In the measurement of the ignition point, alumina was used as a reference sample and the dry metal magnetic powder was used as a measurement sample. A thermal analysis apparatus supplied by Rigaku Denki Co., Ltd. was used and differential thermal analysis was carried out at a temperature-elevating rate of 10° C./min The temperature at which rapid buildup of heat was observed in the sample was defined as the ignition point.

In the heat stability test, the dry powder was stored at a temperature of 60° C. and a relative humidity of 90%, and the saturation magnetization was measured with the lapse of time.

EXAMPLES 2 THROUGH 4

An iron oxide containing silicon and cobalt was prepared in the same manner as that described in Example 1 except that the amounts of sodium silicate and cobalt sulfate were varied as shown in Table 1, and a metal magnetic powder was prepared from this oxide in the same manner as the one described in Example 1. The obtained powder was subjected to the ignition point measurement and heat stability test. The obtained results are shown in Table 1 and FIG. 1.

EXAMPLE 5

An iron oxide containing silicon and cobalt was prepared in the same manner as that described in Example 1 except that a solution of 24 g of cobalt sulfate heptahydrate and 36 g of ferrous sulfate heptahydrate in 160 ml of water was used instead of the solution of 35 g of cobalt sulfate heptahydrate in 160 ml of water used in Example 1, and a metal magnetic powder was prepared from this iron oxide in the same manner as that described in Example 1. The obtained powder was subjected to the ignition point measurement and heat stability test. The obtained results are shown in Table 1 and FIG. 1.

COMPARATIVE EXAMPLE 1

A cobalt-containing metal magnetic powder was prepared in the same manner as that described in Example 1 except that no silicon compound layer was formed. The obtained powder was subjected to the ignition point measurement and heat stability test. The obtained results are shown in Table 1 and FIG. 1.

COMPARATIVE EXAMPLE 2

A metal magnetic powder containing silicon and cobalt was prepared in the same manner as that described in Example 1 except that the amount of diatomaceous earth No. 3 used in the formation of the silicon compound layer was changed to 20 g and the Si/Fe was thus changed to 1.6% by weight. The obtained powder was subjected to the ignition point measurement and heat stability test. The obtained results are shown in Table 1 and FIG. 1.

COMPARATIVE EXAMPLE 3

A metal magnetic powder containing silicon and cobalt was prepared in the same manner as that described in Example 1 except that silicon-containing γ-Fe₂O₃ having an Si/Fe of 0.8% by weight (by the XPS measurement, it was confirmed that silicon was substantially uniformly distributed) was used instead of γ-iron oxide and no SiO₂ was added. The obtained powder was subjected to the ignition point measurement and heat stability test. The obtained results are shown in Table 1 and FIG. 1.

TABLE 1

|  |  | Si/Fe (% by weight) | Co/Fe (% by weight) | Ignition Point (°C.) |
|---|---|---|---|---|
| Example | 1 | 0.6 | 9.5 | 145 |
|  | 2 | 0.3 | 9.5 | 140 |
|  | 3 | 0.6 | 5.4 | 140 |
|  | 4 | 0.3 | 5.7 | 140 |
|  | 5 | 0.6 | 6.5 | 140 |
| Comparative | 1 | 0.05> | 9.6 | 110 |
| tive | 2 | 1.6 | 9.5 | 125 |
| Examples | 3 | 0.8* | 9.6 | 110 |

Note
*formation of the silicon compound layer on the surface of the particle was not conducted.

From the test results of the ferromagnetic metal powders obtained in the Examples and Comparative Examples, it is evident that if no silicon compound layer is formed or if the content of silicon is outside the range specified in the present invention, the ignition point indicating the oxidation resistance is much lower than that of the ferromagnetic powder of the present invention and degradation of the magnetic characteristics with the lapse of time is extreme.

As is apparent from the foregoing description, the powder composed of the ferromagnetic metal particle of the present invention is excellent in the oxidation resistance over conventional ferromagnetic metal powders and retains high coercive force and high saturation magnetization. Accordingly, the powder composed of the ferromagnetic metal powder of the present invention is indispensable as a magnetic material for a magnetic recording medium and is very valuable in the art.

Furthermore, according to the preparation process of the present invention, the ferromagnetic metal particle of the present invention can be prepared very easily.

We claim:

1. A ferromagnetic metal powder comprising a ferromagnetic metal particle composed mainly of iron, a silicon compound layer formed on the surface of the ferromagnetic metal particle in such an amount that the amount of silicon is 0.1 to 1% by weight based on the weight of iron in the ferromagnetic metal particle, and a layer containing a nonferrous transition metal element compound in an amount of from 2 to 15% by weight based on the weight of iron in said ferromagnetic particle, which is formed on the silicon compound layer.

2. A ferromagnetic metal particle comprising:
   (a) a ferromagnetic metal core composed mainly of iron;
   (b) a silicon compound layer formed on the surface of said ferromagnetic metal particle, said silicon compound present in an amount of from 0.1 to 1% by weight, based on the weight of iron in said ferromagnetic metal particle; and
   (c) an outer layer containing a nonferrous transition metal element compound formed on said silicon compound layer; said nonferrous transition metal element compound is present in an amount of from 2 to 15% by weight, based on the weight of iron in said ferromagnetic core.

3. The ferromagnetic particle according to claim 2, wherein said nonferrous transition metal element compound is selected from the group consisting of Co, Ni, Cr, Cn, Mn, and Zn.

4. The ferromagnetic particle according to claim 2, wherein said nonferrous transition metal element compound is present in an amount ob from 4 to 10% by weight based on the weight of iron in said ferromagnetic core.

* * * * *